Patented Feb. 10, 1953

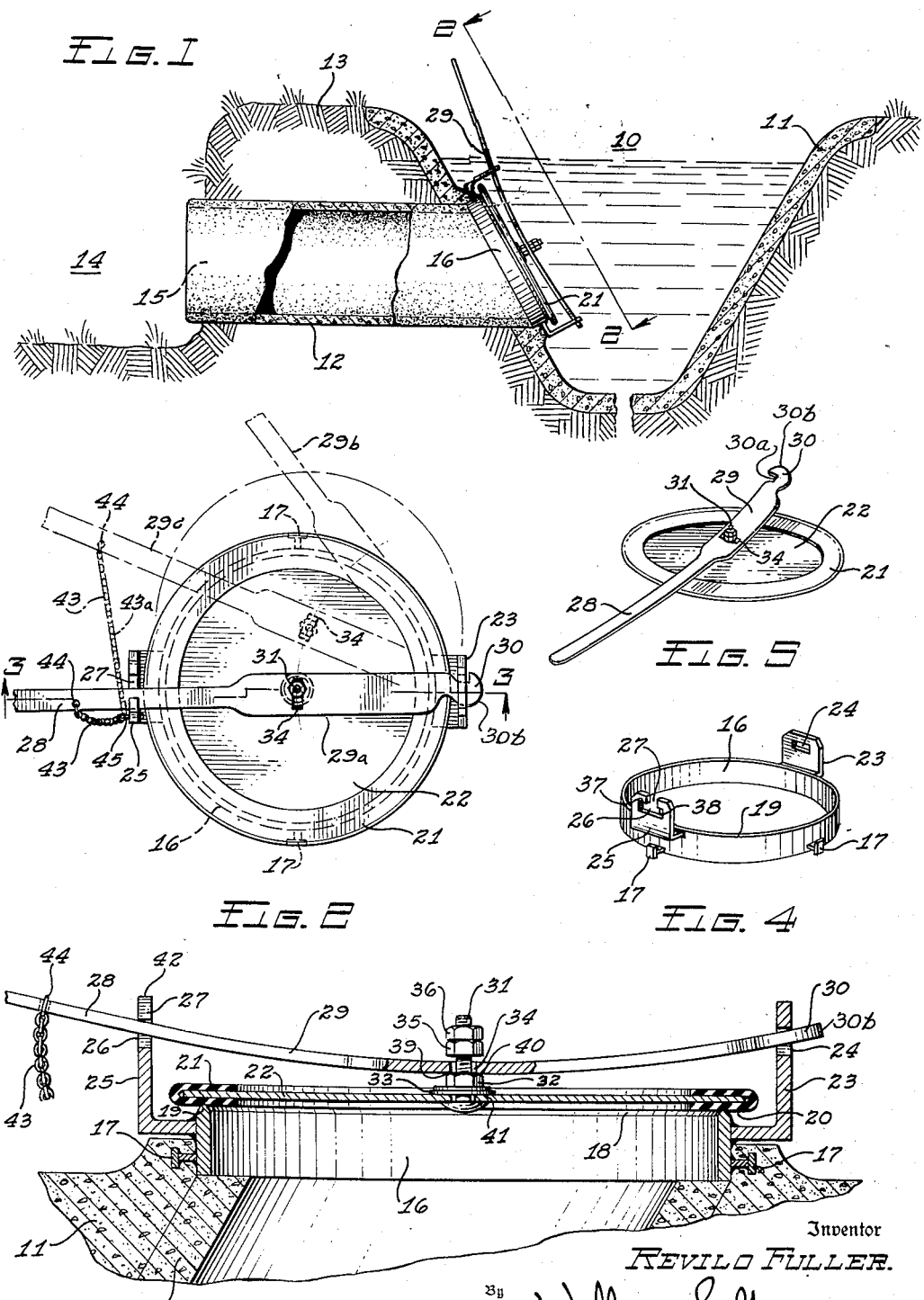

2,628,056

UNITED STATES PATENT OFFICE 2,628,056

LEAKPROOF IRRIGATION VALVE

Revilo Fuller, Phoenix, Ariz.

Application April 10, 1950, Serial No. 154,985

1 Claim. (Cl. 251—19)

This invention pertains to irrigation control valves, and is particularly related to an improved leakproof irrigation headgate valve.

One of the objects of this invention is to provide an improved leakproof irrigation valve which is simple in construction and operation and which is adapted to maintain high operating efficiency over long periods of time.

Another object of this invention is to provide an improved leakproof irrigation valve having clamping means adapted to maintain a constant resilient closing pressure between the valve disc and valve seat at all times and for long extended periods of time.

Another object of this invention is to provide closing mechanism for an irrigation valve which utilizes the resiliency of the valve plate and spring pressure from a novel clamping lever to maintain the valve in leak tight closed condition under all operating conditions.

And it is still further an object of this invention to provide a leakproof irrigation valve with parts requiring no accurate or precision machining operations but which at the same time maintains proper seating between the valve plate and valve seat under all types of operating conditions.

A still further object of this invention is to provide an improved irrigation valve in which the valve member may be readily removed from the valve body and valve seat or reengaged therewith with a minimum of effort and skill required by the operator.

It is still another object in connection with the aforementioned improved irrigation valve, to provide means for relatively adjusting the valve plate and valve seat for various degrees of flow through the valve.

Further features and advantages of this invention will appear from a detailed description of the drawings in which:

Figure 1 is a diagrammatic sectional view showing the utilization of the improved leakproof irrigation valve in connection with an irrigation system.

Figure 2 is a plan view of the irrigation valve indicated by the line 2—2 in Figure 1.

Figure 3 is an enlarged sectional view on the line 3—3 of Figure 2 showing the valve in clamped up condition.

Figure 4 is a perspective view of the valve seat ring.

Figure 5 is a perspective view of the valve plate and operating handle.

While the aforementioned irrigation valve may be used in an infinite variety of ways in irrigation system, for illustrative purposes there is shown in Figure 1 an example of its use in connection with a main irrigation ditch or canal 10 which is preferably lined with cement 11. Suitable headgate discharge pipes 12 may be provided through the shoulder 13 of the irrigation ditch or canal which discharge into lateral canals or drainage ditches 14 from the opening 15.

The irrigation valve proper comprises a main body portion or valve seat ring member 16 which has suitable lugs 17 welded integrally therewith which are embedded in the cement lining 11 or by any other suitable means secured to the irrigation ditch or discharge pipe 12. The ring 16 is provided with a mitered edge 18 so as to form a valve seat 19 which is engaged by the surface 20 of a rubber or similar resilient composition material 21 which is fitted around the edge of the thin valve disc 22 in a manner as best shown in Figure 3.

Welded or otherwise secured integral to the member 16 is the bracket member 23 which projects outwardly beyond the valve seat 19 and has formed in its outer end a rectangular slot 24. Substantially diametrically opposite the member 23 is formed a second member known as the latching member 25 which is securely welded or otherwise formed integral with the rim 16. The member 25 is similarly provided with a slot 26 the upper portion of which is cut away at 27 to allow entrance of the handle portion 28 of the bow-shaped control lever 29. The opposite end of the bow-shaped lever 29 is provided with a hooked end at 30 including the hook notch 30a and the arcuate portion 30b which enters into the slot 24 in the member 23 and hooks around the outer side thereof as best seen in Figure 2 so that the lever 29 cannot be disengaged from the slot 24 unless it is swung from the diametral position shown at 29a in Figure 2 to a position 29b.

In the center of the valve disc 27 is fixed a suitable stud or bolt 31 secured to the plate by means of the nut 32 and washer 33. The stud 31 projects upwardly through an elongated transverse slot 34 formed in the lever 29. On the upper portion of the stud 31 is provided the nut 35 which is held in place by the lock nut 36 so as to allow freedom of movement of the valve plate or disc 22 transversely of the lever 29 and at the same time to provide a certain amount of universal floating movement of the disc 22 on this lever 29. The valve disc 22 at all times is under the control of the movements of the lever 29 by means of its handle 28 as desired by the operator.

When it is desired to close the valve the lever 29 is positioned as shown in Figure 2 in the diametral position 29a, with the valve disc 22 centered over the valve seat 19. The handle portion 28 of the lever 29 is then pressed downwardly or toward the member 25 to have it fully enter through the slot 27. The operator then moves the lever slightly to one side or the other to latch it under the surfaces 37 or 38 associated with the slot 26 so as to latch the lever 29 in valve closed position. Under these conditions the surface 39 of the bow-shaped lever 29 presses against the surface 40 of the nut 32 to force the valve disc 22 and its resilient seal member 21 against the valve seat 19 in such a manner that the bow-shaped condition of the lever 29 maintains a constant resilient back up pressure against the disc 22 at all times. In addition to this resilient back up structure, the thin disc member 22 is also of resilient character so that it may readily and properly seat itself against the valve seat 19 despite the fact that this surface 19 is not necessarily highly accurate or free of corrosion or slight foreign matter such as grass or straw which invariably is present in a valve system of this type. The disc shaped member is capable of adjusting its outer rim portion to any such irregularities and at the same time is slightly depressed at its center portion 41 to provide additional resilient back up pressure to maintain the surface 20 of the gasket 21 always in forceful engagement with the valve seat 19. By this arrangement long closed condition of the valve can be had without leakage developing as in cases of screw operated or similar rigid lever operated valves in which the gasket member 20 may settle or compress over long closed condition periods to ultimately cause leakage of the valve.

When it is desired to open the valve to let flow from the main irrigation into the lateral 14 for example, the operator merely kicks the lever or knocks it with an irrigation shovel or club until the handle portion 28 comes into alignment with the slot portion 27 whereupon the resiliency of both the valve seat and the bow-shaped lever causes the valve to instantly open and break its seat. The operator then may swing the lever transversely of the discharge pipe 12, which now clears over the top surface 42 of the member 25, to one side or the other to some position such as 29c to allow the desired flow to enter the discharge pipe 12, the valve disc 22 merely sliding on the surface 20 of the gasket 21 to any desired sidewise opening position. A suitable chain of variable linkage such as 43 fixed to the handle 28 at 44 and having a suitable hook 45 fixed on the member 25 by which different linkages or links 43a of chain may be provided, allows the operator to set the position 29c at any desired point to give the proper irrigation flow to the discharge pipe 12. In this manner the valve is readily adjustable to any desired modulated flow from the main irrigation canal 10 to the lateral 14.

It is also to be noted that the valve disc 22 may readily be removed from operative position for replacement of the gasket 21 or other examination by simply detaching the chain 43 completely and swinging the lever arm over to the position 29b as described whereupon the end 30 may be detached from the slot 24 in the member 23 and the entire valve disc and lever assembly removed from operative position to any remote point for examination or work upon it.

Having thus fully set forth and described this invention, what is claimed is:

In an irrigation valve, a valve seat ring member, a valve seat on the outer end of said ring member, a valve disc adapted to engage said valve seat, a bracket fixed on the periphery of said ring member having an axially disposed portion having a rectangular opening extending radially of said ring member, a second bracket fixed on the periphery of said ring member at a point diametrically opposite said first mentioned bracket having an axially disposed portion with a T-slot formed therein in a direction radially disposed relative to said ring member, a bow shaped control lever having its convex portion facing toward said valve disc, a hooked end on one end of said lever including, a hook portion disposed in a plane parallel to said valve disc, a hook notch in one side of said hook portion opening in a direction tangentially of said ring member, and an arcuate portion on the outer edge of said hooked end radially disposed relative to the root of said hook notch at a distance equal to the width of the slot formed in said first mentioned bracket so as to restrict radial movement of said lever relative to said ring member, a handle portion formed on the other end of said lever adapted to engage in said T-slot in said second bracket, and means for mounting said disc on said lever.

REVILO FULLER.

REFERENCES CITED

The following references are of record in the file of this patent:

UNITED STATES PATENTS

| Number | Name | Date |
|---|---|---|
| 164,857 | McOmber | June 22, 1875 |
| 253,318 | Simpson | Feb. 7, 1882 |
| 475,135 | Molt | May 17, 1892 |
| 522,137 | Walker | June 26, 1894 |
| 699,891 | McNairy | May 13, 1902 |
| 957,777 | Izer | May 10, 1910 |
| 1,159,399 | Long | Nov. 9, 1915 |
| 1,287,189 | Benner | Dec. 10, 1918 |
| 1,327,351 | Norton | Jan. 6, 1920 |
| 1,332,692 | Spiekerman | Mar. 2, 1920 |
| 1,713,349 | Owen | May 14, 1929 |
| 1,875,857 | Cruff | Sept. 6, 1932 |

FOREIGN PATENTS

| Number | Country | Date |
|---|---|---|
| 500,838 | Great Britain | of 1939 |